Figure 1:
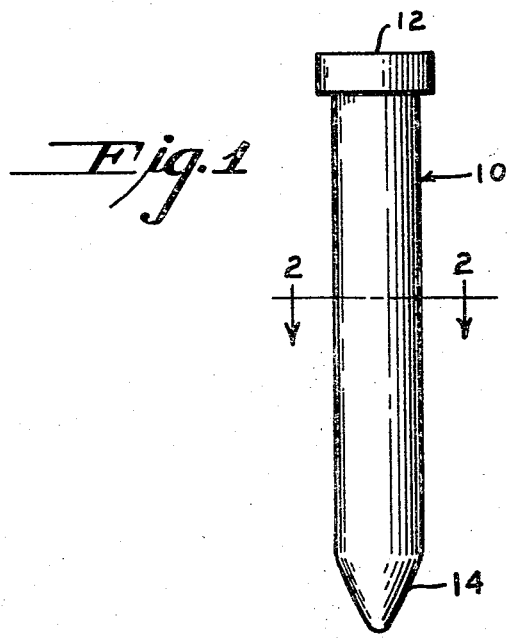

Nov. 17, 1964     A. P. NERO ETAL     3,157,482
METHOD OF USING LAYERED GLASSWORKING TOOL
Filed Feb. 14, 1962

INVENTORS
ANTHONY P. NERO
AND JAMES W. RYAN

BY Clarence R. Patty, Jr.
ATTORNEY 3,157,482
METHOD OF USING LAYERED GLASS-WORKING TOOL
Anthony P. Nero, Corning, and James W. Ryan, Elmira, N.Y., assignors to Corning Glass Works, Corning, N.Y., a corporation of New York
Filed Feb. 14, 1962, Ser. No. 173,259
3 Claims. (Cl. 65—17)

This invention relates to an improved tool or implement adapted to use in contact with molten glass.

A material suitable for construction of a molten glass contacting and working tool must be able to withstand the high temperatures involved, for example 1300 to 1600° C. It must also have good physical and chemical stability in contact with molten glass in order to avoid even a slight amount of erosion or solution in the glass. Refractory oxides of the type used in constructing melting units, such as alumina, are used to some extent, but are susceptible to both mechanical wear and chemical attack in high melting temperature glasses. In these respects, platinum and platinum alloys have proven to be particularly useful materials because of their generally inert characteristics. However, tools fabricated from these metals do not ordinarily have the inherent rigidity required to withstand application of force as in a forehearth plunger and/or stirring device or mechanism. Tools fabricated from molybdenum successfully meet this service condition, but undergo rapid oxidation at elevated temperatures. Such tools can not, therefore, be used in oxidizing atmospheres, or in so-called oxidized glasses, unless effectively shielded. Accordingly, it has been proposed to fabricate glassworking tools, particularly stirrer mechanisms, from molybdenum and to apply a platinum cladding over the molybdenum surface to provide protection against oxidation. The term "platinum" is used generically to include platinum and platinum alloys such as platinum-rhodium.

When platinum-clad molybdenum tools were placed in service, frequent mechanical failures occurred quite unexpectedly. It was found that a porous condition, similar in appearance to that of wormy wood, had developed on the glass contacting surface of the platinum. Actual mechanical failure of the tool appeared to result from development of a crack or failure in the weakened platinum cladding followed by oxidation and fracture of the underlying molybdenum structure at this point. The nature of this attack was rather puzzling inasmuch as simple platinum structures did not appear to be subject to a similar attack.

In attempting to detect the possible source of such composite tool failures, it was discovered that the presence of carbon in platinum, while the latter was immersed in molten glass, could produce a similar type of porous structure in the platinum. The exact nature of the platinum attack is still not well understood. It appears to involve oxidation of carbon diffusing to the platinum surface as well as possible reduction of glass ingredients with the reduced material entering the platinum and possibly dissolving in it. Further study revealed that residual carbon, normally present in molybdenum in varying amounts, was capable of diffusing out of the molybdenum into the platinum cladding, and rather rapidly through the platinum to the glass contacting surface. Additional studies have indicated that this situation can be satisfactorily controlled to permit production of composite platinum-molybdenum glassworking tools providing the level of diffusible carbon is maintained below certain limits.

The invention resulting from these studies is an improved tool for use in contact with molten glass which comprises a molybdenum body portion and a platinum surface cladding, the molybdenum body portion being characterized by a diffusible carbon level of less than 0.01% by weight carbon. The invention further resides in an improved method of producing such a glassworking tool which comprises maintaining the diffusible carbon level below such maximum amount.

As is well known, carbon is normally introduced into molybdenum during its production in order to minimize oxygen embrittlement of the metal. The residual carbon in the finished product may vary considerably depending on production methods. For example, an arc melted molybdenum is specified as normally containing a maximum of 0.04% by weight carbon with a low carbon form available having a maximum of 0.01% carbon. It has been found, however, that the carbon level can be still further reduced by employing alternative reducing agents or by resorting to other methods of molybdenum production such as sintering.

In accordance with the present invention, it would be desirable to eliminate carbon completely, but this does not appear to be either feasible or necessary. Thus, it has been found that consistently satisfactory glassworking tools may be produced with molybdenum having a carbon level of about 0.003 to 0.005% by weight. Further, carbon contents up to about 0.01% may be tolerable.

It will be appreciated that carbonaceous materials on the molybdenum surface, such as oil, grease and the like, will also contribute diffusible carbon. This in itself will normally raise the carbon level well above the tolerable limit. Accordingly, extreme care must be taken to avoid such carbon contamination of the molybdenum during production and fabrication of glassworking products.

Figure 2:
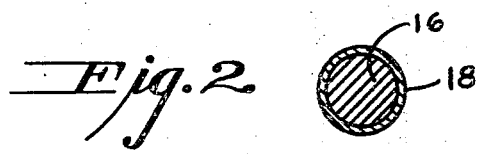

By way of further illustration of the invention, reference is made to the accompanying drawings wherein, FIGURE 1 is a perspective view of a forehearth needle or plunger, and FIGURE 2 is a sectional view taken along line 2—2 of FIGURE 1.

A forehearth needle or plunger, as shown in FIGURE 1 and generally designated by numeral 10, is an elongated, cylindrical body adapted to having its upper end 12 mounted above a glass tank forehearth for vertical reciprocating operation. The lower end 14 is of rounded or conical shape to cooperatively function with a bottom outlet of such forehearth to discharge molten glass in successive charges or gobs by vertical reciprocation of plunger 10. The operating mechanism, forehearth structure, and mounting means are not shown inasmuch as these are well known and form no part of this invention. Forehearth plunger 10 merely exemplifies and illustrates a simple type of glassworking tool to which the improvement of the invention is typically applicable.

In constructing composite plunger 10 in accordance with the present invention, a molybdenum core body 16, having the general shape of the plunger, is initially fabricated. The mechanical fabrication of such molybdenum bodies is well known in the art. In accordance with the present invention, the molybdenum employed in constructing body 16 will have a carbon content below 0.01% by weight and will be free of surface contamination by any form of carbon or carbonaceous material which would contribute to the diffusible carbon level of the body.

The fabricated molybdenum body 16 is then provided with a surface cladding 18. This may be platinum or a platinum alloy, such as platinum with up to 30% rhodium, in thicknesses of, for example, 30–100 mils. The cladding may be mechanically applied in strip form, conformed to the molybdenum core and pressure welded or filleted along the seams. This provides a sealed envelope that may then be carefully evacuated to remove air. Care is taken to avoid carbon contamination during the process. Plunger 10 is then ready for mounting and operation in a glass melting unit or delivery chamber.

Plunger 10 may be so mounted as to be rotated as well as reciprocated. In such case, the plunger may further function as a glass stirrer or homogenizer. The invention is particularly useful in construction of more complicated stirring mechanisms such as shown in U.S. Patent Nos. 2,570,078, 2,570,079, and 2,831,664.

The present invention has been described as having particular utility in connection with fabricating glass delivery and homogenizing devices. However, it will be understood that it has general utility in the fabrication of improved glassworking tools and devices of all types that come in contact with molten glass, particularly during the melting and delivery of such glass. Accordingly, the invention is subject to various modifications and forms within the scope of the appended claims.

What is claimed is:

1. A method of producing glass comprising the step of bringing the glass, in a molten state, into contact with a glassworking tool characterized by a molybdenum body portion, a platinum surface cladding, and a diffusible carbon level in the molybdenum body portion and at the molybdenum-platinum interface of less than 0.01%.

2. A method of stirring glass comprising the step of bringing the glass, in a molten state, into contact with a glass stirring device characterized by a molybdenum body portion, a platinum surface cladding, and a diffusible carbon level in the molybdenum body portion and at the molybdenum-platinum interface of less than 0.01%.

3. In the production of glass wherein molten glass is brought into contact with a glassworking tool fabricated from a molybdenum body portion provided with a platinum surface cladding, the improvement, whereby deterioration of the cladding is minimized, which comprises forming the body portion from molybdenum with a diffusible carbon level below 0.01% and applying platinum cladding to the surface of the body while that surface is kept sufficiently free of carbon contamination to maintain the diffusible carbon level of the clad body below 0.01%.

References Cited in the file of this patent

UNITED STATES PATENTS

| | | |
|---|---|---|
| 2,315,565 | Waltenberg | Apr. 6, 1943 |
| 2,401,040 | Becker | May 28, 1946 |
| 3,070,982 | McGowan | Jan. 1, 1963 |